United States Patent [19]

Chiao et al.

[11] Patent Number: 5,162,076
[45] Date of Patent: Nov. 10, 1992

[54] METHOD FOR PURIFICATION OF ACIDS FROM MATERIALS COMPRISING ACID AND SALT

[75] Inventors: Yu-Chih Chiao, Bridgewater; Frederick P. Chlanda, Rockaway; Krishnamurthy N. Mani, Basking Ridge, all of N.J.

[73] Assignee: Allied-Signal Inc., Morris Township, Morris County, N.J.

[21] Appl. No.: 278,062

[22] Filed: Nov. 30, 1988

[51] Int. Cl.[5] .............................. B01D 61/00
[52] U.S. Cl. .................. 204/182.4; 204/182.3; 204/182.5; 204/301
[58] Field of Search ................ 204/182.4, 182.3, 301, 204/182.5

[56] References Cited

U.S. PATENT DOCUMENTS

| | | | |
|---|---|---|---|
| 2,829,095 | 4/1958 | Oda et al. | 204/98 |
| 3,111,472 | 11/1963 | Oda et al. | 204/180 |
| 3,787,304 | 1/1974 | Chlanda et al. | 204/13 |
| 4,024,043 | 5/1977 | Dege et al. | 204/296 |
| 4,116,889 | 9/1978 | Chlanda et al. | 521/27 |
| 4,391,680 | 7/1983 | Mani et al. | 204/98 |
| 4,536,269 | 8/1985 | Chlanda et al. | 204/182.4 |
| 4,552,635 | 11/1985 | Janczewski | 204/182.4 |
| 4,584,246 | 4/1986 | Liu et al. | 428/522 |
| 4,608,141 | 8/1986 | Chlanda et al. | 204/182.5 |
| 4,738,764 | 4/1988 | Chlanda et al. | 204/296 |
| 4,740,281 | 4/1988 | Chlanda et al. | 204/151 |
| 4,766,161 | 8/1988 | Chlanda et al. | 521/27 |
| 4,781,809 | 11/1988 | Falcone, Jr. | 204/182.4 |
| 4,971,672 | 11/1990 | Voss et al. | 204/182.4 |

FOREIGN PATENT DOCUMENTS

| | | |
|---|---|---|
| 0121611 | 9/1984 | European Pat. Off. . |
| 0269234 | 6/1988 | European Pat. Off. . |
| 3642164 | 6/1988 | Fed. Rep. of Germany ... 204/182.3 |
| 8606646 | 11/1986 | World Int. Prop. O. . |

OTHER PUBLICATIONS

Chemical Abstracts (1959) 53:11070(b)–refers to Japanese 2023 (1958).
J. Appl. Poly Sci., 34,1093 (1987), K. Shimasaki, et al.
Principles of Desalination, Chap. 6, "Electrodialysis", pp. 199-289, L. H. Shaffer, et al., Academic Press, N.Y. (1966) (K. S. Spiegler, Editor).
Journal of Membrane Science, vol. 27, No. 2 Jun. 1986.

Primary Examiner—John Niebling
Assistant Examiner—Arun S. Phasge
Attorney, Agent, or Firm—Karen A. Harding

[57] ABSTRACT

A method of separating acid from an aqueous feed stream comprising acid and salt. The method is conducted in an apparatus comprising a bipolar membrane between at least one first anion membrane and at least one second anion membrane.

25 Claims, 5 Drawing Sheets

METHOD FOR PURIFICATION OF ACIDS FROM MATERIALS COMPRISING ACID AND SALT

BACKGROUND OF THE INVENTION

This invention relates to a process for separating acid from salt solutions containing acid. More particularly, the invention is directed to a new use for an apparatus comprising bipolar membranes and anion membranes to separate acids from solutions comprising acids and salts.

Electrodialytic water-splitting in a two-compartment cell is well known For example, U.S. Pat. No. 4,391,680 discloses the generation of strongly acidified sodium chloride and aqueous sodium hydroxide by two compartment water-splitting of aqueous sodium chloride. Three compartment electrodialytic water splitters are known in the art. They are disclosed to be comprised of alternating bipolar, anion and cation exchange membranes thereby forming alternating acid, salt and base compartments. U.S. Ser. No. 135,562 discloses three compartment electrodialytic water splitters. U.S. Pat. No. 4,740,281 discloses the recovery of acids from materials comprising acid and salt using an electrodialysis apparatus to concentrate the acid followed by the use of an electrodialytic three compartment water splitter to separate the acid from the salt.

U.S. Pat. No. 4,608,141 discloses a multi chamber two compartment electrodialytic water splitter and a method for using the same for the basification of aqueous soluble salts. U.S. Pat. No. 4,536,269 discloses a multi chamber two compartment electrodialytic water splitter and a method for using the same for the acidification of aqueous soluble salts. These two patents review the use of two compartment electrodialytic water splitters and their use to treat salts.

The staging of two conventional two compartment electrodialytic water splitters whereby the base solution is withdrawn from the base compartment of one two compartment water splitter and is fed through the base compartment of the second two compartment water splitter is known. In an attempt to increase the efficiency of bipolar membranes, U.S. Pat. No. 3,111,472 (Oda, et al.) discloses disposing a microporous water permeable cation or neutral membrane in the acid and/or base compartments of the three compartment electrodialytic water splitter.

Although bipolar membranes have been known to be useful for the process of electrodialytic water splitting to generate an acid and a base for many years (Oda et al. U.S. Pat. No. 2,829,095, Chlanda et al. U.S. Pat. No. 3,787,304, Jenczewski et al. U.S. Pat. No. 4,552,635) and their use in various cell configurations has been reported (Oda et al. Japan 2023 ('58) reported in Chemical Abstracts 53:11070b. U.S. Pat. No. 4,536,269 and U.S. Pat. No. 4,608,141) their use as highly selective membranes which effectively transport only $H+$ or $OH-$ ions therefore making them effective for the purification of acids without the generation of the opposite product has not been realized.

None of the above references disclose separating a salt solution containing an acid using a bipolar membrane, in an apparatus such as a two compartment water splitter, followed by removing the salt solution.

The art, such as U.S. Pat. No. 4,536,269, teaches that cation membranes preferentially permit the selective transport of hydrogen ions over other cations such as metal ions over hydrogen ions, but the selectivity is small.

SUMMARY OF THE INVENTION

The present invention is a method of separating acid from an aqueous feed stream comprising acid and a salt. The salt comprises cations and anions. The method of the present invention is conducted using an acid purification apparatus comprising at least one bipolar membrane which comprises a cation layer and an anion layer. The cation layer permits the cations to pass through, and the anion layer permits anions to pass through. The cation layer is a barrier to anions and the anion layer is a barrier to cations. Each bipolar membrane is located between at least one first anion membrane and at least one second anion membrane. The acid purification unit has at least two compartments. A feed compartment is defined as the space between the anion layer of the bipolar membrane and the at least one first anion membrane A product compartment is defined as the space between the cation layer of the bipolar membrane and at least one second anion membrane. While the apparatus used has the same structure as a two compartment water splitter, the function is completely different.

The process comprises the steps of feeding an aqueous feed stream comprising acid and salt to the at least one feed compartment An aqueous product feed stream is fed to the at least one product compartment.

A sufficient electrical potential is applied to cause a direct electrical current to pass across the apparatus, resulting in the introduction of hydrogen ion ($H+$) formed at the bipolar membrane into the product compartment. The current causes the anions to transfer across the at least one anion membrane. The anions transfer into the at least one product compartment. The concentration of acid in the feed compartment is reduced as a result of the transfer of anions and the introduction of $H+$ increases the acid concentration in the product compartment. The process further comprises the step of removing the resulting product stream from the product compartment and removing the resulting feed stream from the feed compartment.

Preferably the apparatus comprises at least one feed compartment with each feed compartment alternating with a product compartment. In a preferred embodiment the apparatus comprises a plurality of alternating bipolar and anion membranes resulting in a plurality of product and feed compartments. Such an arrangement makes the production unit compact and is thereby less capital and space intensive.

In an alternate embodiment of the method of the present invention the apparatus further comprises at least one cation membrane between the at least one anion permselective layer of the bipolar membrane and at least one anion membrane. An acid compartment is defined as the space between the anion layer of the bipolar membrane and the cation membrane. The apparatus used in this embodiment of the present invention is particularly useful where the feed stream comprises metal ions which can form complexes with the anion layer of the bipolar membrane or form insoluble hydroxides and thereby fouling the bipolar membrane. While the apparatus used has the same structure as a three compartment water splitter, the function is completely different.

An additional embodiment of the present invention is a method which comprises the steps of feeding a solution comprising a salt and an acid to a two compartment acid purification apparatus. In the two compartment acid purification unit the solution of the salt and the acid results in a first salt stream. Substantially, all of the acid is separated from this first salt stream. Preferably, the two compartment acid purification unit produces this first salt stream so that the pH of the salt stream is about 7. The acid leaves the two compartment acid purification unit as a first acid stream. The acid which was present in the original salt solution is then removed from the process. The substantially neutral first salt stream is fed to a three compartment water splitter. The salt is split to form a second base stream, a second acid stream comprising an acid and optionally salt and finally the dilute residue of the salt compartment which results in the dilute salt stream. In a specific and preferred embodiment the dilute salt stream is reconcentrated for recycle. The dilute salt stream can be concentrated by suitable means including electrodialysis or reverse osmosis.

The combination of two compartment acid purification unit and three compartment water splitting for the production of acid from solutions of salt which contain significant amounts of acid is advantageous because of the reduced membrane area and power requirements of the two compartment unit compared to a three compartment unit. Some additional operating freedom can also be gained. For example, a neutral salt stream can be fed to the salt compartment of a three compartment water splitter which because the salt stream is neutral a weak base type membrane can be used. Such membranes have high efficiencies.

DETAILED DESCRIPTION OF THE INVENTION

The present invention will be understood by those skilled in the art by reference to the accompanying figures.

The present invention is a method of separating acid from an aqueous feed stream comprising acid and salt comprising metal cations and anions. The method is conducted in an apparatus comprising at least one bipolar membrane comprising a cation layer and an anion layer. Each bipolar membrane is located between at least one first anion membrane and at least one second anion membrane. There is a feed compartment between the anion layer of the bipolar membrane and the at least one first anion membrane. There is a product compartment between the cation layer of the bipolar membrane and at least one second anion membrane.

The method comprises the steps of feeding an aqueous feed stream comprising acid and salt to the at least one feed compartment and feeding an aqueous product stream to the at least one product compartment. A sufficient electrical potential is applied to cause a direct electrical current to pass across the feed compartment and the product compartment causing H+ formed at the bipolar membrane to be introduced into the product compartment. It is believed that water migrating into the anion or cation layer of the bipolar membrane is split so that hydroxyl migrates through the anion layer and hydrogen ion migrates through the cation layer The hydrogen ion is transferred through the cation layer into the product compartment. The anions from the feed stream transfer across the at least one anion membrane into the product compartment. The concentration of acid in the feed compartment is reduced as a result of anion transferred into the product compartment which combines with the hydrogen ions formed at the bipolar membrane to result in an acid. The resulting product stream containing the acid is removed from the product compartment and the resulting feed stream less the acid anions and hydrogen ions and containing the salts is removed from the feed compartment. Specific and preferred embodiments are reviewed below in connection with the accompanying figures.

Figure 1:
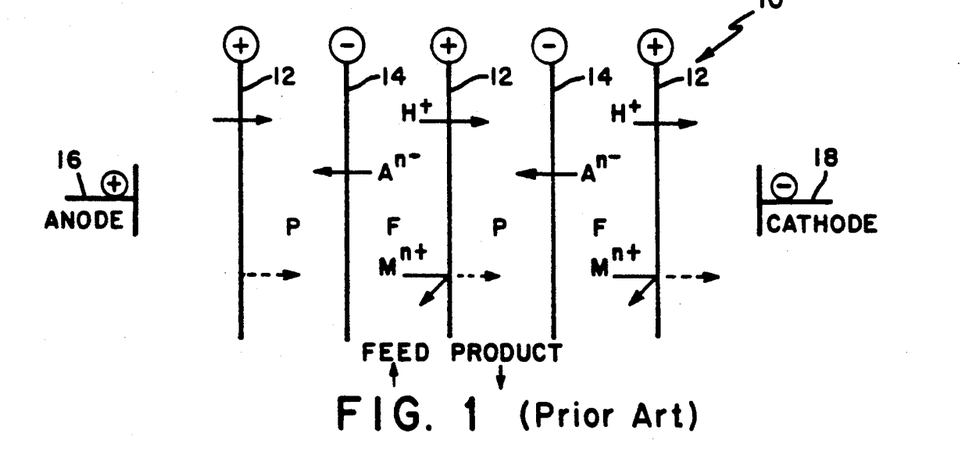
FIG. 1 illustrates a prior art apparatus or cell which contains only monopolar membranes and could be used for the purification of acid.

FIG. 1 is a prior art apparatus, also called a "cell", which is useful for the purification of acid. The prior art cell 10 comprises alternating cation membranes 12 and anion membranes 14. A direct current is applied across the cell by electrodes, anode 16 and cathode 18. The spaces between the anion membranes and the cation membranes are compartments which are substantially enclosed except for inlets and outlets. The anion membrane permits anions $A^{n-}$, having the charge of the n− where n is an integer, to be transported while preventing the passage of cations. The cation membranes are designed to permit hydrogen ions to pass but resist the passage of cations such as metal cations shown as $M^{n+}$ where n is an integer. The dotted line shows that a certain minor amount of the metal cation can leak through the cation membrane. The cation membranes are generally selective to the passage of the hydrogen ion compared to other cations because of the greater mobility of the hydrogen ions.

A feed stream containing salt comprised of cations such as metal cations and anions, and an acid is fed into feed compartment F. In the feed compartment F the anion membrane is closer to the anode, and the cation membrane is closer to the cathode resulting in the hydrogen ions and other cations being driven across the cation membrane and the anions being driven in the opposite direction across the anion membrane. The compartment adjacent to the feed compartment is called the product compartment P. Product compartment P is an enclosed compartment having an inlet and an outlet. The product compartment is between a cation membrane which is closer to the anode and the anion membrane which is closer to the cathode. Therefore hydrogen ions and other cations moving toward the cathode are stopped when they reach the anion membrane 14. Anions move toward the anode and are stopped when they reach the cation membrane 12. A product stream, typically an aqueous stream, is fed into product compartment P. Due to the direct current, the movement of the hydrogen ions and anions into the product compartment P results in acid being formed. The resulting product stream is removed. The product stream contains acid and other cations which have been transported along with the $H^+$ across the cation membrane. The feed stream is removed and contains a portion of the original salt and any acid which did not transfer.

The prior art cell shown is able to achieve some separation of acid from salt, but the purity of the acid produced is relatively low, especially if it is attempted to remove most of acid. Cation membranes which incorporate a thin layer of anion exchange material are known to improve the selectivity of cation membranes for univalent ions. (K. Shimasaki, et al. J. Appl. Poly. Sci., 34, 1093 (1987)). Such membranes are more effective for separating multivalent cations from the acid but significant metal cation transport can still occur and they are not particularly effective in discriminating between $H^+$ and other univalent cations.

Figure 2:
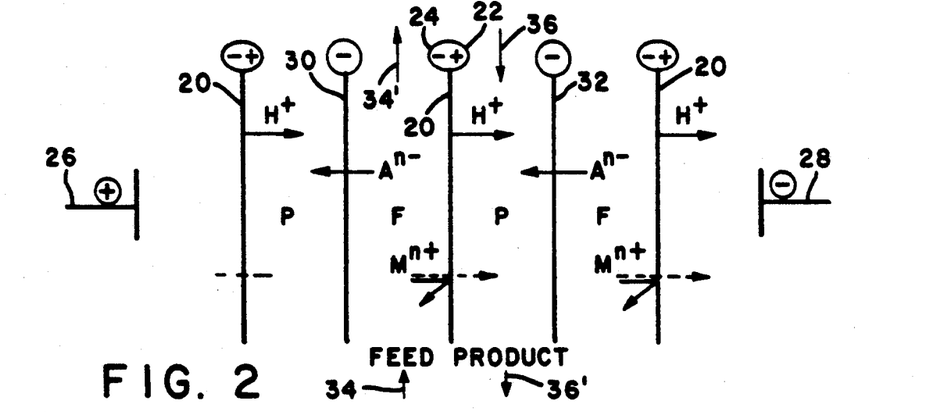
FIG. 2 illustrates an apparatus or cell which employs bipolar membranes and can be used for purification of acid in accordance with the method of the present invention.
Figure 3:
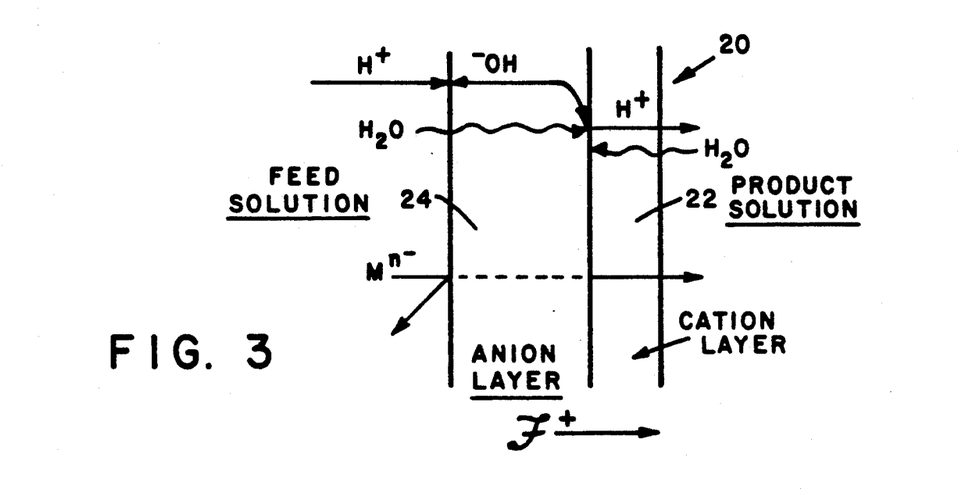
FIG. 3 shows a conceptual detail of a bipolar membrane during operation in accordance with the method of the present invention.

FIG. 2 illustrates an apparatus, or cell, useful in the present invention. The apparatus comprises at least one bipolar membrane 20. FIG. 3 shows a schematic illustration of a bipolar membrane. The polar membrane comprises a cation layer 22 and an anion layer 24 The cation layer is made of a material which permits the passage of cations such as hydrogen ion. The anion layer permits the passage of anions such as hydroxyl ions. The anion and cation layers also permit the passage of water. At the boundry between the anion layer and the cation layer, hydrogen ions and hydroxyl ions are formed by ionization of water. A sufficient electric potential applied across the membrane will cause a net migration of the positively charged hydrogen ions through the cation layer toward the cathode and the negatively charged hydroxyl anions through the anion selective layer toward the anode.

In the preferred embodiment of the present invention, illustrated in FIG. 2, the bipolar membrane 20 is between a first anion membrane 30 and a second anion membrane 32. There is a feed compartment F between the anion layer 24 of the bipolar membrane and the at least one first anion membrane 30. There is a product compartment P between the cation layer 22 of the bipolar membrane and the at least one second anion membrane 32. The cation layer 22 faces cathode 22

In accordance with the method of the present invention, an aqueous feed stream 34 comprising acid and cations, such as metal or ammonium cations, is fed to the at least one feed compartment F. An aqueous product stream 36 is fed to the product compartment P. The aqueous product stream 36 can contain acid and soluble salts. A direct electrical current introduced by electrodes 26 and 28 is passed across feed compartments F and product compartment P causing hydrogen ion formed in the bipolar membrane to be introduced into the product compartment P. The electrical current causes the anions $A^{n-}$ to transfer across the anion permselective membranes. The concentration of acid in the feed compartment is reduced as a result of the anion and net hydrogen ion transport to the product compartment. The resulting product stream 36' is removed from the product compartment and the resulting treated feed stream 34' is removed from the feed compartment.

In accordance with the method of the present invention the apparatus can further comprise a plurality of alternating bipolar membranes and anion membranes resulting in at least one feed compartment wherein each feed compartment is alternating with one product compartment.

Since the bipolar membrane is capable of eliminating the transport of almost all cations other than $H^+$, the acid produced contains far less salt (i.e. cationic impurity) than the feed stream. The cations include mono, di and trivalent metallic and non metallic cation including ammonium. The anions include monovalent anions such as halides, divalent anions such as sulfates, trivalent anions such as phosphates and mixtures thereof. Typical acid salt combinations which can be purified include HCl/NaCl, acetic acid/NaOAc, HCl/NH$_4$Cl, Na$_2$SO$_4$/H$_2$SO$_4$, H$_2$SO$_4$/FeSO$_4$/Fe$_2$(SO$_4$)$_3$, NaNO$_3$/HNO$_3$, NH$_4$NO$_3$/HNO$_3$, Na$_3$PO$_4$/H$_3$PO$_4$, HNO$_3$/Ni(NO$_3$)$_2$, HBF$_4$/Cr(BF$_4$)$_3$, H$_2$SO$_4$/CuSO$_4$, or HF/KF. Mixtures of acids may also be purified with respect to cationic impurities e.g. HF/HNO$_3$/Ni(NO$_3$)$_2$ can be processed to give purified HF/HNO$_3$.

Many metals readily form complexes with anions such as chloride or fluoride e.g. FeCl$_4^-$ and TiF$_6^=$. When these ions are present there is a tendency for them to be transported across the anion membrane and therefore the acid produced may not be free of metallic impurities. However, the purity will be higher than it would have been if a cation membrane were used in place of the bipolar membrane and cationic metallic contaminants were transported across the cation membrane as well.

Acid feed streams can have an acid concentration in a range of from 0.1 N up to concentrations of 5N or more with the higher concentrations being applicable generally with weaker (less highly ionized) acids. The concentration of the product will usually be higher than the concentration of the feed, but may be equal or lower especially when the feed concentration is high. The efficiency of a system of the type shown in FIG. 2 depends on the selectivity of the anion membrane. Better anion membranes allow the generation of higher acid concentrations. Preferably the concentration of acid in the feed is 0.5N to 5N and most preferably 1 to 3N. The salt can be at concentrations up to saturation, preferably from 0.001 molar to saturation concentration, and are typically 0.1 molar or more.

The resulting product stream 36' will have no more than 0.1 times and preferably no more than 0.01 times the salt concentration as the original feed stream 34.

Useful operating temperatures of from 0° C. and 100° C. are possible if the stability of the membranes and the solubility of the solution constituents permit. Generally, membrane life is longer at lower temperatures and power consumption will be lower at higher temperatures. Preferred operating temperatures are between 25° and 60° C. and more preferably from 35° and 50° C. In the case of sulfuric acid, a temperature greater than 45° C. is most preferred.

Unlike the coated cation membranes of the prior art which contain only a thin coating of anion exchange material, bipolar membranes useful in the present invention contain a significant thickness of anion exchange material which is highly selective to the transport of anions. Such membranes are described in U.S. Pat. No. 4,024,043 (Dege et al.), U.S. Pat. No. 4,116,889 (Chlanda et al.) and U.S. Pat. No. 4,584,246 (Liu et al.). Since the anion exchange membrane excludes cations according to the Donnan principle (see L. H. Shaffer and M. S. Mintz, Chapter 6, "Electrodialysis" in, *Principles of Desalination*, Academic Press, NY (1966), K. S. Spiegler editor) rather than simply on the basis of charge number or ionic size, it is generally more selective and is effective with all cations regardless of charge number. Conceptually, the high selectivity of the bipolar membrane for $H^+$ could be achieved as illustrated in FIG. 3. Because of Donnan exclusion, cations (including $H^+$) are excluded from the anion layer. $H^+$ is able to travel through the anion layer as part of the neutral water molecule. The water molecule at the interface between the anion and cation exchange layers of the bipolar membrane can ionize into $H^+$ and $OH^-$ which are transported according to the electrical potential gradient across the membrane. $OH^-$ generated at the interface reacts with $H^+$ either within or just outside of the anion layer of the membrane. The net result is the nearly exclusive transport of $H^+$ across the membrane.

Certain acid containing streams, e.g. streams from stainless steel pickling may contain relatively small amounts of acid and large amounts of metal ions which can form complexes with the anion layer of the bipolar membrane or form insoluble hydroxides. For such streams, the cell arrangement shown in FIG. 4 which incorporates an additional conventional cation membrane 38 can be used to help avoid damage to the anion layer of the bipolar membrane.

Figure 4:
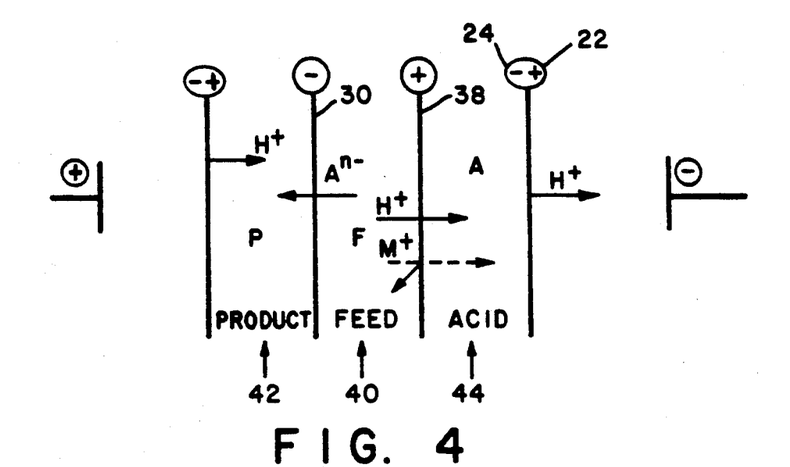
FIG. 4 illustrates an alternate embodiment of the present invention useful for purification of highly contaminated acids.

In the method using the apparatus illustrated in FIG. 4 there is at least one cation membrane 38 between the anion layer 24 and at least one anion membrane 30. There is an acid compartment A between the anion layer of the bipolar membrane and the cation membrane. The feed stream 40 comprises metal ions which can form complexes with the anion layer or form insoluble hydroxide which could foul the bipolar membrane. An aqueous stream 42 is fed to the product compartment, and an aqueous acid stream 44 fed to the acid compartment A. The operation of the apparatus or cell stack as illustrated in FIG. 4 is analogous to that illustrated in FIG. 2 and described above in connection therewith. The acid compartment acts as a barrier to help reduce the concentration of metal ions near the anion surface of the bipolar membrane.

The purpose of the cation membrane is to reduce the concentration of metals near the anion surface of the bipolar membrane by taking advantage of the selectivity of cation membranes for $H^+$ ion transport. The acid fed to the acid compartment A formed by the cation and bipolar membranes can be a portion of the product from the feed compartment. The ratio of $H^+$ to metal ions transported across the cation membrane should be higher than in the feed, especially when the metal is present as a neutral or anionic complex. The concentration of metal ions in the acid compartment can be kept lower than in the feed compartment. The acid from the acid compartment can be fed into the feed stream after it has become sufficiently contaminated with metals. There is no loss in acid recovery, but the efficiency of the process is lowered. Essentially the same effect may be achieved by treating the salt contaminated acid stream in the prior art apparatus of FIG. 1 and introducing the product of that apparatus as the feed to the apparatus of the present invention shown in FIG. 2. The use of the single apparatus as shown in FIG. 4 is more advantageous because of its simplicity, reduced equipment requirements including fewer membranes, and reduced operating requirements including reduced power and pumping capacity.

Figure 5:
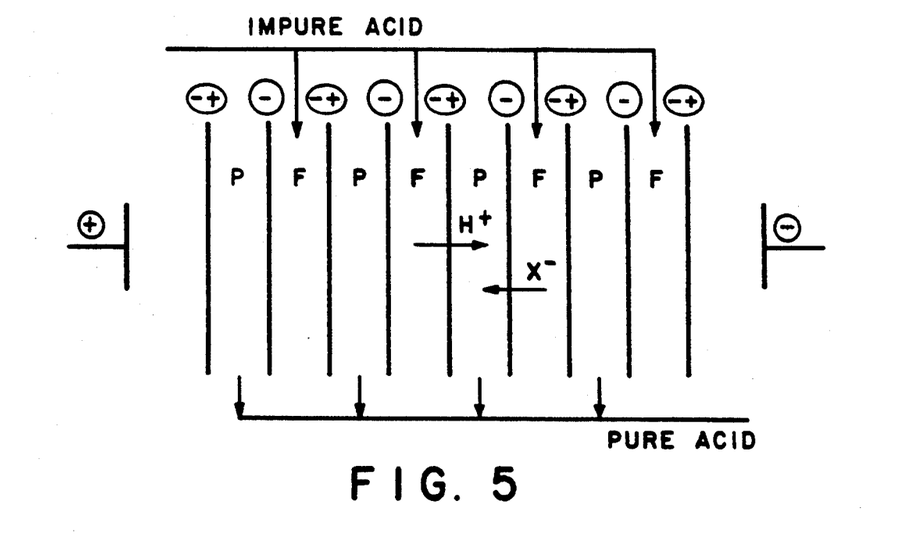
FIG. 5 illustrates a schematic drawing of an apparatus used in examples of the present invention.
Figure 9:
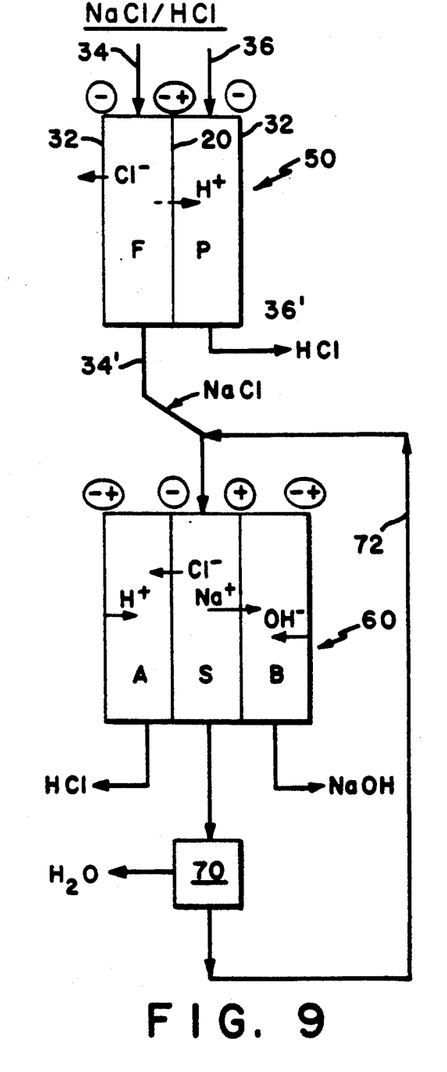
FIG. 9 illustrates a schematic flow chart for a specific embodiment of the present invention wherein streams of acids contain cations which do not form insoluble hydroxides.

FIG. 9 illustrates a specific and preferred embodiment of the method of the present invention wherein streams of acids which contain metallic cations or ammonium ion which do not form insoluble hydroxides may be treated in the 2-compartment acid purification unit 50 of the type illustrated in FIG. 2 to recover substantially all of the acid from the product compartments. Reference characters in FIGS. 2 and 9 are common for common elements. The resulting stream 34' from the feed compartment F comprises a substantially neutral salt. This neutralized stream 34' may be treated with a 2-compartment or 3-compartment watersplitter to recover a base and additional acid. As shown in FIG. 5 complete recovery can be obtained using a 3-compartment water splitter 60. Such 3-compartment water spitters are disclosed in U.S. Pat. No. 4,740,281, incorporated by reference. Optionally, a means 70 of concentrating the dilute salt stream from the water splitter is provided so that the salt may be recycled via recycle stream 72 to salt compartment S of the water splitter. A concentrating means includes an electrodialytic cell (ED cell) also of the type described in U.S. Pat. No. 4,740,281. Major advantages of such a process over prior art methods which require neutralization of the salt stream with product base are that the total membrane area and power are reduced since a portion of the process is performed in a 2-compartment unit instead of all in a 3-compartment unit and the volume of the dilute salt effluent from the water splitter is reduced since aqueous base has not been added. The embodiment illustrated in FIG. 9 can be used to make pure HCl from a stream 34 containing NaCl and HCl.

Figure 10:
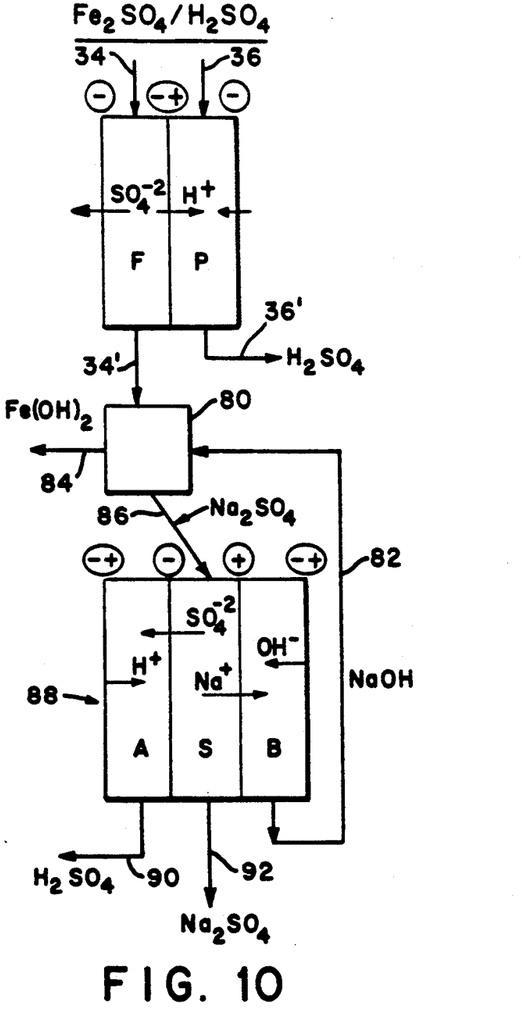
FIG. 10 illustrates a schematic flow chart for a specific embodiment of the present invention wherein streams of acids contain cations which do form insoluble hydroxides.

FIG. 10 illustrates a specific and preferred embodiment of the method of the present invention where cations which form insoluble hydroxide are present. The recovery of acid cannot be complete since some acidity is needed to prevent fouling of the anion side of the bipolar membrane with metal hydroxides.

Figure 6:
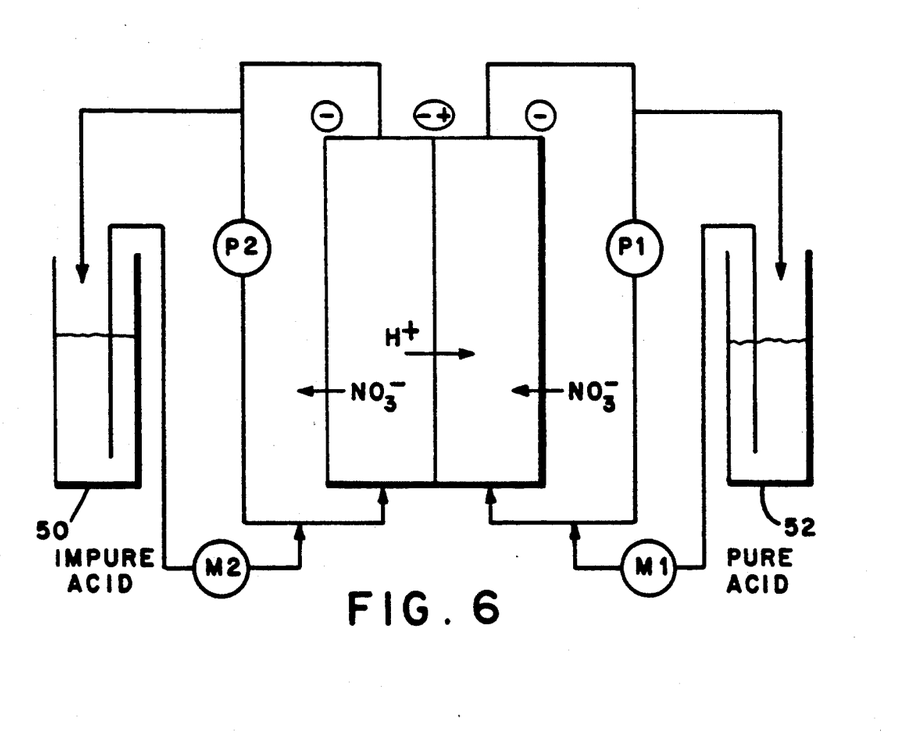
FIG. 6 illustrates the flow diagram of an apparatus useful for the method of the present invention.

As with the embodiment illustrated in FIG. 9 reference characters in FIGS. 2 and 6 are common for common elements. The resulting feed stream 34' is treated to remove insoluble hydroxides. In FIG. 10, the feed stream 34' is fed to neutralizer/filter 80. The stream 34' contains salt and dilute acid. A water soluble, aqueous base stream 82 is fed to neutralizer/filter 80. An insoluble base forms and is filtered out and removed via insoluble base line 84. An aqueous salt stream 86 of the neutralized water soluble salt can be fed to a 2 or 3 compartment water splitter such as 3-compartment water splitter 88. This results in an acid, salt and base stream 90, 92 and 82 respectively. The base stream 82 can be recycled to neutralizer/filter 80. The salt stream 92 can be concentrated as described with reference to concentrating means 70 in FIG. 9. Although some dilution of the salt stream to be processed occurs and although a greater portion of the process must be completed in the 3-compartment unit, some of the advantage over direct neutralization is retained.

Examples of bipolar membranes which are particularly useful include those described in U.S. Pat. No. 2,829,095 to Oda, et al. (which has reference to water splitting generally), in U.S. Pat. No. 4,024,043 (which describes a single film bipolar membrane), and in U.S. Pat. No. 4,116,889 (which describes a cast bipolar membrane and is most preferred). However, any means capable of splitting water into hydrogen and hydroxyl ions may be used: for example, spaced apart anion and cation membranes having water disposed therebetween.

Useful cation membranes employed can be moderately acidic (e.g., phosphonic group-containing) or strongly acidic (e.g., sulfonic group=containing) cation permselective membranes having a low resistance at the pH at which they are employed. Particularly useful cation membranes are Dupont's Nafion ® 110 and 324 cation membranes. More preferably, the cation membranes are of the composition and construction as disclosed in U.S. Pat. No. 4,738,764, to Chlanda, et al. and commonly assigned. the net input rate to obtain the desired composition changes for the entire system even though the concentration change in one pass through the stack may be small. Feed to each recycle loop of the system and product removal may be made continuously (steady state operation) or periodically (batch operation).

With regard to the acid purification, the acid would not necessarily need to be recovered as the acid, but could be converted to another product. For example a stream consisting of $H_2SO_4/Cr_2(SO_4)_3$ could be used as the feed and the acid product stream treated with $Ca(OH)_2$ to make a relatively innocuous waste of gypsum. Treatment of the remaining Cr containing stream from which acid had been removed would give a smaller volume of the more hazardous Cr containing waste or make recovery of the Cr simpler. Other useful bases to neutralize the acid include but are not limited to NaOH, KOH and $NH_4OH$.

The following examples illustrate the practice of the present invention. The examples should not be construed as limiting the invention to anything less than that which is disclosed or which would have been obvious to one of ordinary skill in the art therefrom.

In the example the current efficiency ($\eta$, eta) was calculated by mass balance i.e. the change in $H^+$ content of the feed and/or product was determined from volume and concentration change. $H^+$ concentration was determined by titration to pH 5 with standard NaOH solution. The recirculation reservoirs were calibrated with a scale so that the volume could be read. The formula for calculation of current efficiency is:

current efficiency = moles of $H^+$ gained in product or lost from feed $\div$ (number of cells $\times$ current (A) $\times$ time (sec) $\div$ 96,500 (coul/mole))

Useful anion membranes used are strongly, mildly, or weakly basic anion membranes. Usable membranes are, for example, commercially available from Ionics, Inc., Watertown, Mass. (sold as Ionics 204-UZL-386 anion membrane), or from Asahi Glass Co. (sold under the trade name Selem ® AMV AAV, ASV anion permselective membranes).

The current passed through the water splitter in conventional fashion is direct current of a voltage dictated by design and performance characteristics readily apparent to the skilled artisan and/or determined by routine experimentation. Current densities between 25 and 300 amps per square foot (between 28 and 330 milliamps per square centimeter) are preferred: and current densities between 50 and 150 amps per square foot (between 55 and 165 milliamps per square centimeter) are more preferred. Higher or lower current densities can be used for certain specific applications.

Periodically interrupting or greatly reducing the electric current, preferably for 0.5 to 5 minutes and more preferably for 1 to 3 minutes can be helpful in reducing the effects of fouling (i.e. metal ion complexation and metal hydroxide contamination) of the anion layer of the bipolar membrane. The intervals between and duration of such interruptions will depend on the relative amounts of acid and metals and the fluid flow in the cell. Effective periods and intervals can be determined by experimentation. An increase in the pressure needed to maintain flow through the feed compartments would be one indication that a current interruption should be made and that the current should not be increased to normal until the high pressure returned to a normal level.

In electrodialysis and related processes, generally the flow rate through the stack is higher than the input rate of fresh feed. The stack is operated in a recycle mode with the recycle feed being obtained from a recycle reservoir. In this way, one can determine and adjust Efficiency is reported as Acid Efficiency for the time interval, and cumulative efficiency (Cumm eta) from the start of the experiment. Stack voltage is the total applied potential (measured with a high impedance volt meter) including the potential needed for the electrode reactions. Metal concentrations were determined by either atomic absorption (AA) or inductivity coupled argon plasma (ICAP) spectroscopy.

EXAMPLE 1

Figure 7:
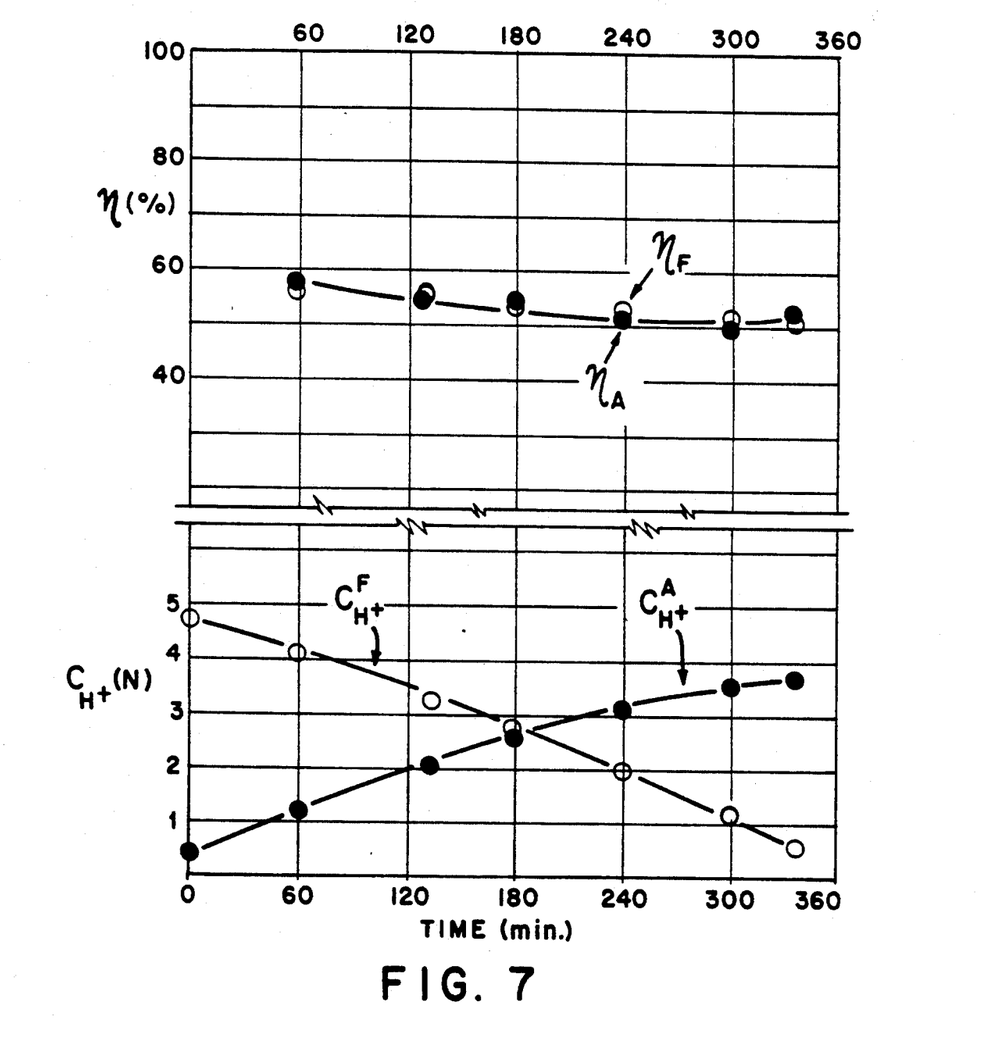
FIG. 7 is a graph of current efficiency ($\eta(\%)$) and fed and product concentration versus time.

The electrodialysis stack illustrated in FIGS. 5 and 6 was assembled. The stack consisted of Pt anode, bipolar membrane, four sets of alternating anion exchange and bipolar membranes, and stainless steel cathode which formed anode compartment, four sets of alternating product and feed compartments and cathode compartment. Each of the membranes had an area of 23 $cm^2$ in the shape of a regular hexagon and were separated by a space 1.25 mm. The bipolar membranes prepared in accordance with U.S. Pat. No. 4,766,161 were oriented with their anion permeable face toward the anode. The anion membranes were Asahi Glass AAV from Asahi Glass. The anode and cathode compartments were fed from a reservoir containing 1 L of 0.5M sulfuric acid by a pump not shown in FIG. 6. With reference to FIG. 6, the initial Feed solution (Impure Acid) (50) was 251 mL of 4.70N sulfuric acid containing 280 ppm $Fe^{+3}$, 290 ppm $Mn^{+2}$ and 3200 ppm of $Al^{+3}$ (such a feed might represent the composition of a spent Al anodizing bath). The product reservoir (pure acid) (52) was charged with 250 mL of 0.4 N sulfuric acid. Solution from the reservoirs was introduced to the recirculation loops by pumps M1 and M2 at a rate >100 mL/min and circulated through the compartments of the stack by pumps P2 and P1 at about 500 mL/min. Excess solution introduced into the recirculation loops was returned to the reservoirs. A direct current of 2.5A was passed for a total of 336.5 minutes while the solutions were recirculated through the cell. The concentrations of acid in the feed ($C_H^F+$) and product ($C_H^P+$) during the experiment are shown in FIG. 7 along with the current efficiency for sulfuric acid production. The final product was 3.65N sulfuric acid, had a volume of 263 mL and contained 1.3 mg Fe, 1.3 mg Mn, and 6.7 mg of Al. The final feed solution was 0.56 N sulfuric acid, had a volume of 177 mL and contained 266 ppm Fe, 309 ppm Mn, and 3285 ppm Al. While about 90% of the acid initially present in the feed was recovered, only 0.7% of the Al was transported to the product.

EXAMPLE 2

Purification of sulfuric acid. The apparatus was the same as used for Example 1 except that the feed was charged with 315 mL of 4.15 N sulfuric acid containing 42 ppm $Cd^{+2}$, 221 ppm $Fe^{+3}$ and 68 ppm $Ca^{+2}$ and the product was charged with 301 mL of 0.3 N sulfuric acid. The feed may represent the waste product of battery acid reclamation. After passing a current of 2.0 A for 420 minutes the feed was 233 mL of 0.95 N sulfuric acid containing 50 ppm of Cd, 299 ppm Fe and 84 ppm Ca. The product was 361 mL of 3.47 N sulfuric acid containing 1.4 ppm Cd, 5.8 ppm Fe and 4 ppm Ca.

COMPARATIVE 1

A stack similar to the stack used in Example 1 was used except that the bipolar membranes were replaced with cation membranes with a resistance of 3 ohm $cm^2$ prepared according to U.S. Pat. No. 4,738,764 thus forming a conventional electrodialysis apparatus of the prior art. The feed was 170 mL of 8.76 N sulfuric acid containing 138 ppm $Ca^{+2}$, 450 ppm $Fe^{+3}$ and 90 ppm $Cd^{+2}$. A current of 2.5 A was passed for 430 min. The sulfuric acid in the final feed solution was 0.82 N. The product was withdrawn throughout the experiment and replaced with water at rates of 0.65 to 0.85 mL/min. The analysis of the withdrawn solution is given in Table I.

TABLE I

| Time (min) | Fe (ppm) | Cd (ppm) | Ca (ppm) | $H_2SO_4$ (N) |
|---|---|---|---|---|
| 185 | 35 | 7 | 22 | 3.52 |
| 275 | 43 | 12 | 30 | 3.60 |
| 340 | 58 | 19 | 46 | 3.58 |
| 380 | 70 | 27 | 63 | 3.08 |
| 410 | 85 | 33 | 75 | 3.34 |
| Avg. | 57 | 19 | 52 | |

Thus the acid produced by the prior art process is about 10 times less pure even though the ratio of impurities to acid is similar.

EXAMPLES 3-5

Impure acid to be purified was 1.26 N $HNO_3$ containing 739 ppm $Al^{+3}$, 900 ppm $Fe^{+3}$, 130 ppm $Mg^{+3}$, 420 ppm $Ca^{+2}$, 40 ppm $Ni^{+2}$, 34 ppm $Mn^{+2}$, 25 ppm $Cu^{+2}$, and 2600 ppm Na. Such an acid could be waste from a uranium extraction process.

EXAMPLE 3

The apparatus and method of Example 1 were used to process impure $HNO_3$. 1L of 0.5N $HNO_3$ was used to feed the electrode compartments. The recirculation of impure acid through the stack was <300 mL/min. The concentrations and volumes of the pure and impure acids observed during the experiment as well as the approximate current efficiencies are listed in Table 2. Impurities in the final pure acid product were as follows: $Al^{+3}$ 9.0 ppm, $Fe^{+3}$ 1.7 ppm, $Mg^{+2}$ 0.2 ppm, $Ca^{+2}$ 1.0 ppm, $Ni^{+2}$ 0.7 ppm, $Mn^{+2}$ 0.1 ppm and $Cu^{+2}$ 0.1 ppm.

Following the experiment, the cell was disassembled for inspection of the membranes. The anion membranes were like new. The bipolar membranes showed a reddish brown precipitate (presumably $Fe(OH)_3$) on their anion surface and extending out into the cell. The precipitate was loosely adhering and dissolved readily in $HNO_3$. The bipolar membrane showed no damage due to the precipitate. Results are summarized in Table 2.

TABLE 2

| time (min) | [H+] (m/L) | V obs (mL) | V out[1] (mL) | Acid[2] Eta | Cum.[3] Eta | Stack Volts |
|---|---|---|---|---|---|---|
| Pure Acid | | | | | | |
| 0.0 | .20 | 250 | 0.0 | — | — | — |
| 21.0 | .59 | 252 | 5.0 | .872 | .872 | 14.20 |
| 58.0 | 1.26 | 260 | 5.0 | .791 | .817 | 13.50 |
| 106.0 | 2.00 | 268 | 5.0 | .716 | .770 | 13.30 |
| 169.2 | 2.61 | 281 | 5.0 | .527 | .678 | 13.30 |
| 228.8 | 3.15 | 292 | 5.0 | .537 | .641 | 13.80 |
| 279.6 | 3.53 | 298 | 5.0 | .473 | .610 | 15.30 |
| time (min) | [H+] (m/L) | V obs (mL) | V out[1] (mL) | Acid Eff. | Cum. Eta | Stack Volts |
| Impure acid | | | | | | |
| 0.0 | 1.26 | 1000 | 5.0 | — | — | — |
| 24.5 | 1.15 | 986 | 5.0 | .880 | .880 | 14.10 |
| 73.0 | .95 | 963 | 5.0 | .707 | .761 | 13.40 |
| 108.5 | .80 | 947 | 5.0 | .691 | .737 | 13.30 |
| 170.8 | .55 | 922 | 5.0 | .636 | .700 | 13.30 |
| 230.6 | .35 | 900 | 5.0 | .509 | .650 | 13.70 |
| 262.5 | .20 | 884 | 5.0 | .688 | .655 | 14.40 |

[1]Taken for analysis
[2]Current efficiency for the time interval
[3]Average current efficiency from the start of the experiment

EXAMPLE 4

The experiment of Example 3 was repeated except that the current was interrupted for 2 minutes at half hour intervals in order to allow time for the precipitate which might have formed in the impure acid compartments to be redissolved. This type of operation should reduce the possibility of plugging of the cells and eventual damage to the bipolar membranes.

After the experiment, the cell was open for inspection. There was only a trace of precipitate in the impure acid compartments. The final pure acid contained 2.4 ppm Fe, 1.6 ppm Ca, and 1.7 ppm Al.

TABLE 3

| time (min) | [H+] (m/L) | V obs (mL) | V out (mL) | Acid Eff. | Cum. Eta | Stack Volts |
|---|---|---|---|---|---|---|
| Pure Acid | | | | | | |
| 0.0 | .22 | 249 | 0.0 | — | — | 13.58 |
| 30.0 | .80 | 259 | 5.0 | .892 | .892 | 15.43 |
| 60.0 | 1.32 | 263 | 5.0 | .770 | .829 | 14.81 |
| 90.0 | 1.76 | 266 | 5.0 | .683 | .779 | 14.66 |
| 120.0 | 2.15 | 269 | 5.0 | .643 | .744 | 14.66 |
| 150.0 | 2.50 | 271 | 5.0 | .582 | .711 | 14.73 |
| 180.0 | 2.86 | 275 | 5.0 | .650 | .701 | 14.85 |
| 215.0 | 3.17 | 276 | 5.0 | .479 | .664 | 15.20 |
| 240.0 | 3.40 | 277 | 5.0 | .521 | .649 | 15.53 |
| 272.0 | 3.65 | 279 | 5.0 | .479 | .629 | 16.50 |
| Impure Acid | | | | | | |
| 0.0 | 1.24 | 1004 | 0.0 | — | — | — |
| 31.6 | 1.10 | 988 | 5.0 | .877 | .877 | |
| 61.0 | .99 | 974 | 5.0 | .640 | .758 | |
| 91.0 | .85 | 959 | 5.0 | .773 | .763 | |
| 121.0 | .70 | 944 | 5.0 | .805 | .774 | |
| 151.0 | .60 | 930 | 5.0 | .534 | .725 | |
| 181.0 | .47 | 914 | 5.0 | .671 | .716 | |
| 215.0 | .39 | 900 | 5.0 | .361 | .659 | |
| 241.0 | .25 | 889 | 5.0 | .784 | .673 | |
| 261.0 | .20 | 882 | 5.0 | .359 | .648 | |
| 272.0 | .15 | 871 | 0.0 | .654 | .649 | |

EXAMPLE 5

The experiment was performed in the same manner using the same apparatus as for Example 3 except that this time a higher (>500 mL/min) recirculation rate for the impure acid was used. The results for the experiment are given in Table 4. Following the experiment, the cell was disassembled and the membranes inspected. There was hardly any precipitate in the cell, certainly much less than noted in Example 3. This confirms the importance of good flow in avoiding precipitate formation in the cell.

TABLE 4

| time (min) | [H+] (m/L) | V obs (mL) | V out (mL) | Acid Eff. | Cum. Eta | Stack Volts |
|---|---|---|---|---|---|---|
| 0.0 | .20 | 396 | 5.0 | — | — | — |
| 30.0 | .60 | 399 | 1.0 | .975 | .975 | 16.40 |
| 60.0 | .93 | 408 | 20.0 | .754 | .858 | 15.50 |
| 90.0 | 1.30 | 397 | 1.0 | .832 | .849 | 15.10 |
| 120.0 | 1.57 | 406 | 20.0 | .657 | .800 | 14.90 |
| 150.0 | 1.85 | 394 | 1.0 | .654 | .770 | 14.80 |
| 180.0 | 2.20 | 401 | 20.0 | .837 | .781 | 15.00 |
| 210.0 | 2.43 | 389 | 1.0 | .568 | .750 | 15.20 |
| 223.0 | 2.51 | 391 | 5.0 | .492 | .735 | 15.50 |
| Impure Acid | | | | | | |
| 0.0 | 1.25 | 1000 | 20.0 | — | — | |
| 30.0 | 1.15 | 967 | 1.0 | .663 | .663 | |
| 60.0 | .95 | 954 | 10.0 | 1.097 | .890 | |
| 90.0 | .80 | 931 | 1.0 | .815 | .864 | |
| 120.0 | .65 | 917 | 10.0 | .793 | .846 | |
| 150.0 | .54 | 894 | 1.0 | .573 | .790 | |
| 180.0 | .40 | 880 | 10.0 | .698 | .775 | |
| 210.0 | .25 | 857 | 1.0 | .717 | .766 | |
| 220.0 | .22 | 852 | 2.0 | .359 | .748 | |
| 223.0 | .20 | 850 | 0.0 | 1.139 | .753 | |

The final pure acid product contained the following metal impurities Na 90 ppm, Fe 0.8 ppm, Ca 0.8 ppm, Al 0.4 ppm. The improved flow through the impure acid compartments may have also been responsible for this increase in the produce purity.

COMPARATIVE EXAMPLE 2

The prior art apparatus of comparative example 1 was used to recover acid from waste stainless steel pickle liquor. The waste (impure) acid contained 0.41 M $Fe^{+3}$ (23,000 ppm), 0.094 M $Ni^{+2}$ (5500 ppm), and 0.084 M $Cr^{+3}$ (4400 ppm). In addition, the waste liquor contained 2.33 M $F^-$ and 1.2 M $NO_3^-$. By difference, the $H^+$ (free acid) concentration of the pickle liquor was 1.87 M. 7500 mL of waste pickle liquor was used to feed the impure acid compartments and processed at 2.5 A over a period of several days. Each day, 1752 mL of fresh 0.1N $HNO_3$ was placed in the pure (product) acid reservoir and removed the next day. The analysis of the product acid and the percent of free acid recovered were as follows:

TABLE 6

| Batch # | Time (hr) | HNO3 moles/L | HF moles/L | Fe (ppm) | Ni (ppm) | Cr (ppm) | % Free Acid Recovered |
|---|---|---|---|---|---|---|---|
| 1 | 24.0 | 2.57 | 0.29 | 591 | 766 | 185 | 18 |
| 2 | 26.0 | 2.48 | 0.25 | 745 | 1063 | 276 | 39 |
| 3 | 24.4 | 2.38 | 0.25 | 865 | 1515 | 394 | 58 |
| 4 | 18.0 | 1.87 | 0.16 | 880 | 2049 | 495 | 72 |

Although the product acid could be recycled to the pickling operation it contains a high level of metal impurities.

EXAMPLE 6

The apparatus shown in FIG. 5 and 6 and described in example 1 was used to process the waste from a stainless steel pickling operation. The waste (impure) acid contained 0.32 M $Fe^{+3}$ (18,000 ppm), 0.072 M $Ni^{+2}$ (4200 ppm), and 0.067 M $Cr^{+3}$ (3500 ppm). In addition, the waste acid contained 0.22 M $K^+$, 1.16 M $NO_3^-$ and 1.76 M $F^-$. By difference, the $H^+$ (free acid) concentration of the pickle liquor was 1.4 M. To start, 1470 mL of the waste pickle liquor was charged to the impure acid reservoir and 323 mL of 0.5 M $HNO_3$ was placed in the pure acid reservoir. The pure acid contained about 12 ppm Fe, 12 ppm Ni and 3 ppm Cr at the start of the experiment. A current of 2.5 A was passed through the cell for 6 hours. At 1 hour intervals, 10 mL samples of this acid were titrated. The molar acid concentrations were after 1 hour-1.45 M, 2 hours-2.1 M, 3 hours-2.75 M, 4 hours-3.25 M, 5 hours-3.73 M. The final volume of product was 335 mL and was 4.20 N. It contained about 95 ppm Fe, 20 ppm Ni and 9 ppm Cr. Based on the amount of pure acid product, 78% of the free acid had been recovered. The amount of metallic impurity in the product is about 20 times less than in comparative example 2. The anion surface of the bipolar membrane was covered with a tightly adhering brown precipitate. It is believed that the accumulation of such a precipitate in operation over longer periods of time would have resulted in irreversible damage to the bipolar membrane.

EXAMPLE 7

Figure 8:
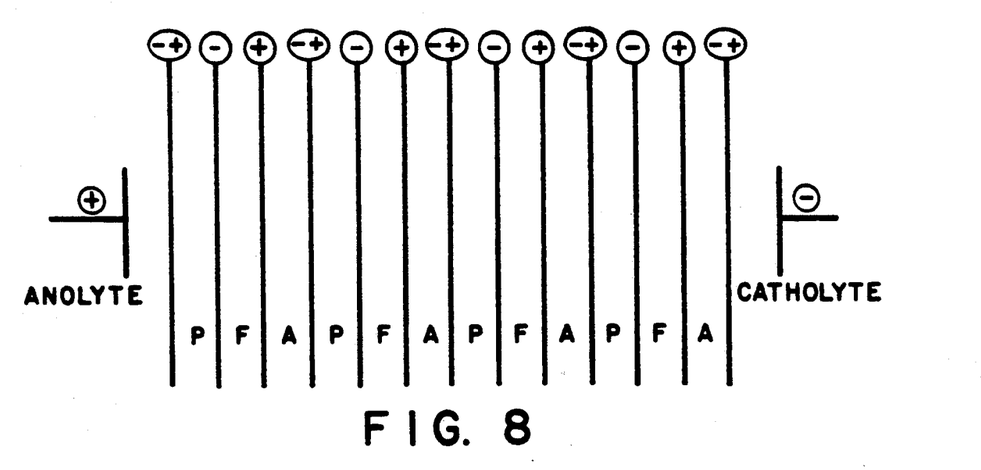
FIG. 8 is a schematic drawing of an apparatus used in an alternate embodiment of the present invention.

Apparatus was assembled as shown schematically in FIG. 8. The anolyte and catholyte compartments were supplied with 1L of 0.5 M KOH solution. 906 mL of waste pickle liquor was circulated to the compartments marked F. The waste (impure) acid contained 0.35 M $Fe^{+3}$ (19,500 ppm), 0.079 M $Ni^{+2}$ (4600 ppm), and 0.089 M $Cr^{+3}$ (4600 ppm). In addition, the waste acid contained 0.25M $K^+$, 1.18 M $NO_3^-$ and 1.88 M $F^-$. By difference, the $H^+$ (free acid) concentration of the pickle liquor was 1.36 M. The compartments marked A were fed with 350 mL of 0.5 M $HNO_3$. The compartments marked P were charged with 330 mL of 0.49 M $HNO_3$ containing 1.7 ppm Fe, 0.2 ppm Cr and 0.2 ppm Ni. A current of 2.5 A was passed for 4.0 hr. Following the experiment 86% of the free acid had been recovered from the F compartment feed and the solution from the P compartments was 3.00 N $HNO_3$ and 0.27 N HF and contained 12.9 ppm Fe, 0.5 ppm Cr and 0.3 ppm Ni. Additional pure acid could be recovered by treating the solution in the A compartments. Following the experiment, there was no sign of precipitate on the anion surface of the bipolar membrane.

What is claimed is:

1. A method separating a strong acid from an aqueous feed stream comprising said strong acid and salt, comprising cations and anions, in an apparatus comprising at least one bipolar membrane comprising a cation layer and an anion layer, wherein each bipolar membrane is between at least one first anion membrane and at least one second anion membrane, there being a feed compartment between the anion layer and the at least one first anion membrane, and a product compartment between the cation layer and the second anion membrane, comprising the steps of:

feeding an aqueous feed stream having a pH of less than 3 comprising a strong acid and metal cations to the least one feed compartment;

feeding an aqueous product stream to the at least one product compartment;

applying a sufficient electrical potential across the apparatus to cause a direct current resulting in the introduction of H+ from the bipolar membrane into the product compartments and transport of anions from the feed across the anion membrane into the product compartment; and removing the resulting product stream from the product compartment; and removing the resulting feed stream from the feed compartment.

2. The method as recited in claim 1 wherein the apparatus comprises a plurality of alternating bipolar membranes and anion membranes.

3. The method as recited in claim 1 wherein the apparatus comprises at least one feed compartment, each feed compartment alternating with one product compartment.

4. The method as recited in claim 1 wherein the apparatus further comprises at least one cation membrane between the anion layer of said bipolar membrane and at least one anion membrane, there being an intermediate compartment between the anion layer and said at least one cation membrane, a feed compartment between said anion membrane and said cation membrane, and a product compartment between the cation layer of said bipolar membrane and said at least one second anion membrane.

5. The method as recited in claim 4 wherein the feed stream comprises metal ions which can form complexes with the anion layer or form insoluble hydroxides.

6. The method as recited in claim 1 wherein the salts are selected from the group consisting of NaCl, NaNO$_3$, NH$_4$Cl, Na$_2$SO$_4$, FeSO$_4$, Fe$_2$(SO$_4$)$_3$, Ni(NO$_3$)$_2$, NiSO$_4$ Cr(BF$_4$)$_3$, NH$_4$NO$_3$, Na$_3$PO$_4$, CuSO$_4$, KF and mixtures thereof.

7. The method as recited in claim 1 wherein the acids are selected from the group consisting of HCl, H$_2$SO$_4$, HNO$_3$, HBF$_4$, HF, H$_3$PO$_4$ and mixtures thereof.

8. The method as recited in claim 1 wherein the acid concentration is from 0.1 N to 5 N.

9. The method as recited in claim 1 wherein the salt concentration is from 0.001 molar to saturation.

10. The method as recited in claim 1 wherein the electric current is from 25 to 300 amps per square foot.

11. The method as recited in claim 1 wherein the current is stopped or substantially reduced for from 0.5 to 5 minutes at intervals of from 15 minutes to 2 hours.

12. The method as recited in claim 1 wherein the linear flow velocity in the at least one feed compartment is at least 2.5 cm/sec.

13. The method as recited in claim 1 wherein the resulting product stream contains no more than one tenth of said salt present in said aqueous feed stream.

14. The method as recited in claim 1 wherein the resulting feed stream has a pH of less than 3.

15. The method of claim 1 where the product acid is neutralized with a base.

16. The method of claim 15 where the base is selected from the group consisting of NaOH, KOH, NH$_4$OH, Ca(OH)$_2$ or mixtures thereof.

17. A method of separating acid from an aqueous feed stream comprising acid and salt, comprising cations and anions, in an apparatus comprising at least two bipolar membranes, a first bipolar membrane and a second bipolar membrane, each bipolar membrane comprising a cation layer and an anion layer, at least one anion membrane and at least one cation membrane, the anion membrane and cation membrane being between the two bipolar membranes, the anion membrane being between the cation layer of the first bipolar membrane and the cation membrane, and the cation membrane being between the anion layer of the second bipolar membrane and the anion membrane, there being an intermediate compartment between the anion layer and the cation membrane, a feed compartment between the anion membrane and cation membrane, and a product compartment between the cation layer and the anion membrane, comprising the steps of:

feeding an aqueous feed stream comprising strong acid and metal cations to the at least one feed compartment;

feeding an aqueous product stream to the at least one product compartment;

feeding an acidic or neutral intermediate aqueous stream to the at least one intermediate compartment;

applying a sufficient electrical potential across the apparatus to cause a direct current resulting in the introduction of H+ from the bipolar membrane into the product compartments and transport of anions from the feed across the anion membrane into the product compartment;

removing the resulting product stream from the product compartment;

removing the resulting intermediate stream form the intermediate compartment; and moving the resulting feed stream from the feed compartment.

18. The method as recited in claim 17 wherein the feed stream comprises metal ions which can form complexes with the anion layer or form insoluble hydroxides.

19. A method comprising the steps of:
 feeding a solution comprising salt and an acid to a feed compartment of a two compartment acid purification unit comprising at least one bipolar membrane comprising a cation layer and an anion layer, wherein each bipolar membrane is between at least one first anion membrane and at least one second anion membrane, there being a feed compartment between the anion layer and the at least one first anion membrane;

splitting the solution of salt and acid to form a first salt stream and a first acid stream;

feeding the first salt stream to a feed compartment of a three compartment water splitter comprising at least two bipolar membranes, a first bipolar membrane and a second bipolar membrane, each bipolar membrane comprising a cation layer and an anion layer, between the two bipolar membranes at least one anion membrane and at least one cation membrane, the anion membrane being between the cation layer of the first bipolar membrane and the cation membrane, and the cation membrane being between the anion layer of the second bipolar membrane and the anion membrane, there being an acid compartment between the anion layer and the cation membrane, a feed compartment between the anion membrane and cation membrane, and a product compartment between the cation layer and the anion membrane; and splitting the first salt stream to form a second acid stream, and a second base stream comprising a base and optionally salt, and a dilute salt stream.

20. The method of claim 19 wherein the first salt stream has a pH of less than 3.

21. The method of claim 19 further comprising the step of purifying the first salt stream to remove heavy metal impurities.

22. The method of claim 19 further comprising the step of concentrating the dilute salt stream.

23. The method of claim 19 wherein the dilute salt stream is concentrated by electrodialysis.

24. The method as recited in claim 19 wherein the dilute salt stream is concentrated by reverse osomsis.

25. The method as recited in claim 19 wherein the three compartment water splitter comprises an acid compartment, a base compartment and a salt compartment and the dilute salt stream is fed to the base compartment.

* * * * *